US006570854B1

(12) United States Patent
Yang et al.

(10) Patent No.: US 6,570,854 B1
(45) Date of Patent: May 27, 2003

(54) SYSTEM AND METHOD FOR PERFORMING EXPLICIT RATE MARKING FOR FLOW CONTROL IN ATM NETWORKS USING A VIRTUAL BANDWIDTH-BASED METHODOLOGY

(75) Inventors: Tao Yang, Acton, MA (US); Ping Wang, Nashua, NH (US); Wengang Zhai, Westford, MA (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 09/312,780

(22) Filed: May 17, 1999

(51) Int. Cl.$^7$ .............................................. G08C 25/02

(52) U.S. Cl. ..................... 370/236.1; 370/231; 370/232
(58) Field of Search ................................ 370/230–235, 370/236.1

(56) References Cited

U.S. PATENT DOCUMENTS

| | | | | |
|---|---|---|---|---|
| 5,675,576 A | * | 10/1997 | Kalampoukas et al. ...... | 370/232 |
| 5,701,291 A | * | 12/1997 | Roberts ...................... | 370/232 |
| 5,784,358 A | * | 7/1998 | Smith et al. ................. | 370/230 |
| 5,946,324 A | * | 8/1999 | Mishra et al. ............... | 370/468 |
| 5,966,381 A | * | 10/1999 | Buckley et al. ............. | 370/395 |
| 6,052,361 A | * | 4/2000 | Ansari et al. ................ | 370/232 |
| 6,178,159 B1 | * | 1/2001 | He et al. ..................... | 370/234 |
| 6,269,078 B1 | * | 7/2001 | Lakshman et al. .......... | 370/230 |
| 6,324,165 B1 | * | 11/2001 | Fan et al. .................... | 370/232 |
| 6,359,863 B1 | * | 3/2002 | Varma et al. ................ | 370/232 |

OTHER PUBLICATIONS

X. Zhang & J. Wu, "A Novel Explicit Rate Flow Control Mechanisim in ATM Networks", IEEE Jan. 2001, p. 1576–1580.*

Lakshman, Mishra, and Ramakrishman, "Transporting Compressed Video Over ATM Networks with Explicit–Rate Feedback Control", IEEE/ACM vol. 7, No. 5, Oct. 1999.*

K. Y. Kim, B. S. Kim, Y. B. Choi, S. T. Ko, and K.S. Kim, "Optimal Rate Based Flow Control for ABR Services in ATM Networks", IEEE Jun. 1999, p. 773–776.*

B. Vandalore, R. Jain, R. Goyal, S. Fahmy, "Design and Analysis of Queue Control Functions for Explicit Rate Switch", IEEE 03/98, p. 780–786.*

Y. T. Oh, S. H. Cho, and S. H. Park, "Adynamic Bandwidth Allocation Based on Transfer Rate Ratio for ABR Service in ATM Networks", IEEE 1998, p. 471–474.*

A. Dinesh, and M. Moh, "An Efficient Traffic Control Scheme for Intergrated Voice, Video and Data over ATM Networks: Explicit Allowed Rate Algorithm", IEEE 1997, p. 398–403.*

(List continued on next page.)

Primary Examiner—Hassan Kizou
Assistant Examiner—Thai D Hoang (57) ABSTRACT

An explicit rate marking system is disclosed for use in connection with a switching node to generate an explicit rate value for use in a resource management cell associated with a virtual circuit in an ATM network. The explicit rate marking system comprises a virtual bandwidth value generator module and an explicit rate value generator module. The virtual bandwidth value generator module generate a virtual bandwidth value reflecting an available bandwidth capacity value, an explicit rate value associated with each bottlenecked virtual circuit for which the switching node forms part of a path, and a minimum cell rate value associated with each unbottlenecked virtual circuit for which the switching node forms part of a path. The explicit rate value generator module generates the explicit rate value in relation to the virtual bandwidth value and the minimum cell rate value associated with the virtual circuit and other virtual circuits for which the switching node forms part of a path.

8 Claims, 10 Drawing Sheets

OTHER PUBLICATIONS

S. Chong, S. Lee, and S. Kang, "A Simple, Scalable, and Stable Explicit Rate Allocation Algroithm for MAX–MIN Flow Control with Minimum Rate Guarantee", IEEE/ACM, vol. 9, No. 3, Jun. 2001, p. 322–335.*

O. Imer, T. Basar, and R. Srikant, "A Distributed Gobally Convergent Algorithm for Fair, Queue–Length–Base Congestion Control", IEEE Sep. 2001, p. 622–627.*

Y. T. Hou, H. H. Y. Tzeng, S. S. Panwar, and V. P. Kumar, "Fair Network Bandwidth Allocation with Minimum Rate Guarantee and Its ABR Implemetations", IEEE Aug. 1997, pp. 1411–1416.*

B. Melander, M. Bjorkman, and P. Gunningberg, "A New End–to–End Probing and Analysis Method for Estimating Bnadwidth Bottleneck", IEEE Jan. 2000, p. 415–420.*

* cited by examiner

126. EXPLICIT RATE MARKING SYSTEM 36 DETERMINES AN ABR RATE VALUE AND A NON-ABR RATE VALUE

127. EXPLICIT RATE MARKING SYSTEM 36 RESETS THE TOTAL COUNTER AND THE INTERVAL ABR CELL COUNTER

128. EXPLICIT RATE MARKING SYSTEM 36 UPDATES AN ABR BANDWIDTH CAPACITY VALUE

129. EXPLICIT RATE MARKING SYSTEM 36 DETERMINES WHETHER THE CURRENT ABR CELL OCCUPANCY IS BELOW A LOW THRESHOLD VALUE

NO →

YES ↓

130. EXPLICIT RATE MARKING SYSTEM 36 GENERATES A PROPORTIONALITY VALUE AS THE DIFFERENCE BETWEEN MAXIMUM AND INTERMEDIATE UTILIZATION FACTORS DIVIDED BY THE LOW THRESHOLD VALUE

131. EXPLICIT RATE MARKING SYSTEM 36 GENERATES VBF UTILIZATION FACTOR VALUE AS THE MAXIMUM UTILIZATION FACTOR VALUE MINUS A VALUE CORRESPONDING TO THE PROPORTIONALITY VALUE TIMES THE VALUE PROVIDED BY THE BUFFERED ABR CELL COUNTER

SYSTEM AND METHOD FOR PERFORMING EXPLICIT RATE MARKING FOR FLOW CONTROL IN ATM NETWORKS USING A VIRTUAL BANDWIDTH-BASED METHODOLOGY

FIELD OF THE INVENTION

The invention relates generally to the field of digital communications systems and more particularly to digital networks for facilitating communication of digital data in, for example, digital image, audio and video distribution systems and among digital computer systems. The invention is more particularly directed to a digital network in which message transfer paths may be provided with various classes of transfer service, including an unregulated available bit rate service and provides a mechanism for allowing the network to control the rate at which devices transmit messages over the network based on congestion along the path between source devices and destination devices.

BACKGROUND OF THE INVENTION

Digital networks have been developed to facilitate the transfer of information, including data and programs, among digital computer systems and other digital devices. A variety of types of networks have been developed and implemented using diverse information transfer methodologies. In networks in which information is transferred using the well-known "ATM" ("Asynchronous Transfer Mode") transfer methodology, communications are handled through a mesh of switching nodes. In an ATM network, the computer systems and other devices are connected to various ones of the switching nodes to, as information sources, provide information for transfer over the network and/or, as destinations, receive information from the network, with the information being transferred over paths, termed "virtual paths" and "virtual circuits," established through switching nodes comprising the network. The virtual circuits through an ATM network can be assigned to various types of service classes, which serve to govern the rate at which information, in the form of "cells," is transferred thereover. In some service classes, virtual circuits are guaranteed maximum rates at which information can be transferred thereover. Other service classes, on the other hand, provide "available bit rate" ("ABR") services, for which virtual circuits are each guaranteed a minimum information transfer rate, referred to as a "minimum cell rate" ("MCR") and can also make use of the bandwidth which has not been assigned to the virtual circuits which have the guaranteed maximum rates. For virtual circuits for which guaranteed maximum rates are provided, the sources already know the rates at which they can transmit information.

However, for virtual circuits which are associated with ABR service classes, the rate at which the sources can transmit may vary based on a number of factors, including, but not limited to, congestion conditions at the destination as well as congestion conditions at each switching node along the respective path from the source to the destination. To facilitate notifying each source of a virtual circuit which makes use of the ABR service class of the maximum rate at which it can transfer over the virtual circuit, the source periodically transmits a "resource management" ("RM") cell over the virtual circuit, the RM cell including the MCR assigned to the virtual circuit. When the destination receives the RM cell, it transmits the RM cell back to the source in the reverse direction along the virtual circuit. The destination can include an explicit rate value in the backward RM cell which indicates the maximum rate at which the source can tmsmit information. Each switching node along the path can also determine the maximum rate at which it can allow the source to transmit information and, if that rate is lower than the explicit rate contained in the backward RM cell, it can substitute its rate as the explicit rate value in the backward RM cell. Thus, when the source receives the backward RM cell, the explicit rate contained therein will be the minimum value generated by the destination and all of the switching nodes along the path defined by the virtual circuit.

SUMMARY OF THE INVENTION

The invention provides a new and improved system and method, referred to herein as a virtual bandwidth explicit rate marking system, for performing explicit rate marking of resource management (RM) cells in an ATM network.

In brief summary, the invention provides an explicit rate marking system for use in connection with a switching node to generate an explicit rate value for use in a resource management cell associated with a virtual circuit in an ATM network. The explicit rate marking system comprises a virtual bandwidth value generator module and an explicit rate value generator module. The virtual bandwidth value generator module generate a virtual bandwidth value reflecting an available bandwidth capacity value, an explicit rate value associated with each bottlenecked virtual circuit for which the switching node forms part of a path, and a minimum cell rate value associated with each unbottlenecked virtual circuit for which the switching node forms part of a path. The explicit rate value generator module generates the explicit rate value in relation to the virtual bandwidth value and the minimum cell rate value associated with the virtual circuit and other virtual circuits for which the switching node forms part of a path.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
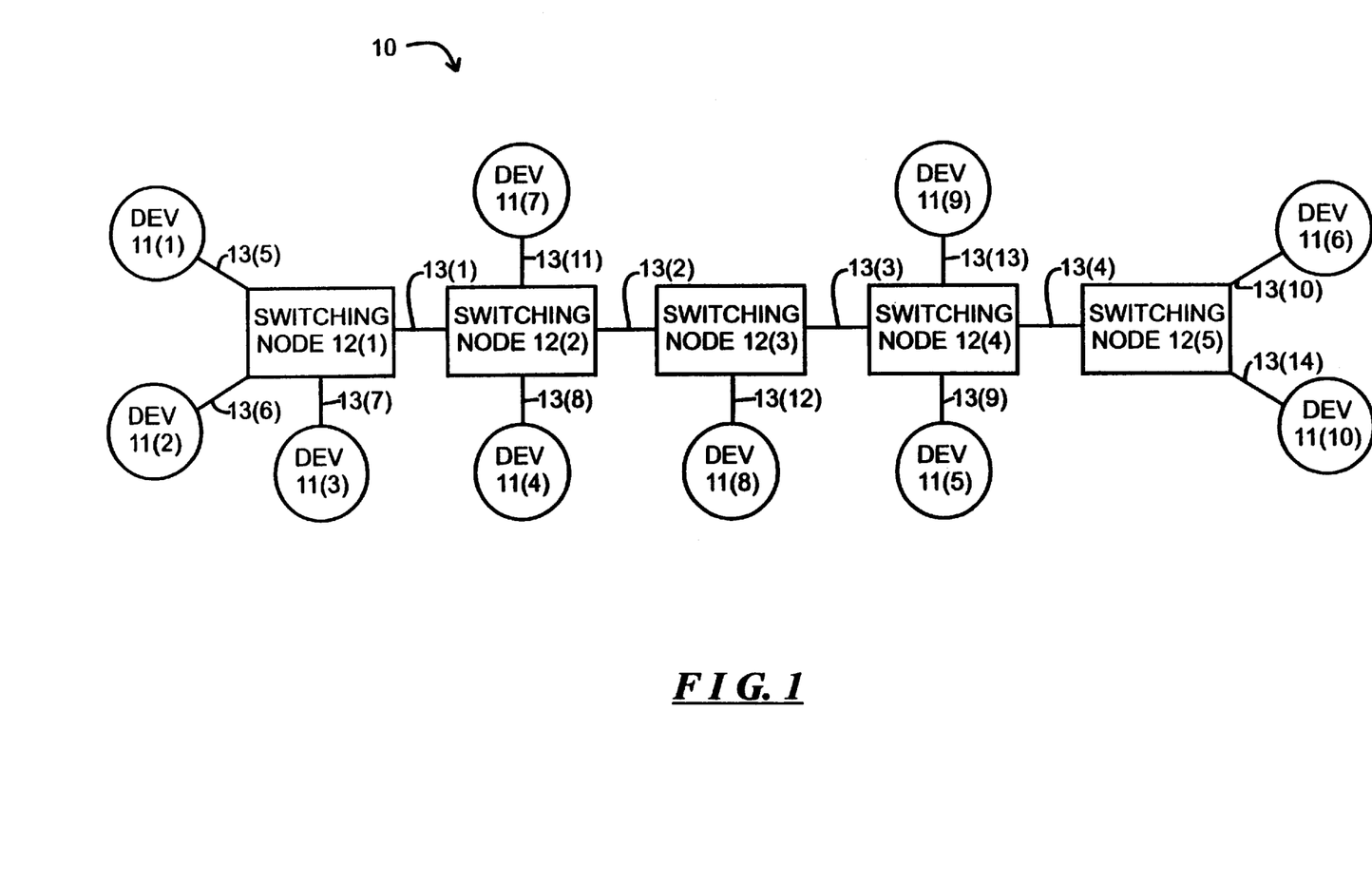
FIG. 1 schematically depicts an ATM network including a system for performing explicit rate marking for flow control in ATM networks using a virtual bandwidth-based methodology, constructed in accordance with the invention.

FIG. 1 schematically depicts an illustrative ATM network 10 including a system for performing explicit rate marking for flow control in ATM networks using a virtual bandwidth-based methodology, constructed in accordance with the invention. With reference to FIG. 1 network 10 includes a plurality of switching nodes 11(1) through 11(5) (generally identified by reference numeral 11(n)) for transferring signals representing data among a number of devices 12(1) through 12(10) (generally identified by reference numeral 12(m)). The devices 12(m) may comprise any of a number of types of-devices, including, for example, digital computer systems, other networks, customer premises equipment, and the like. In their operations, certain devices $12(m_S)$ (subscript "S" referencing "source") may, as a source device, need to transfer data to another, destination, device $12(m_D)$ (subscript "D" referencing "destination"), which may need to use the transferred information in its operations. Each device 12(m) is connected over a communication link, generally identified by reference numeral 13(j), to a switching node 11(n) to facilitate transmission of data thereto or the reception of data therefrom. The switching nodes 11(n) are interconnected by communication links, also generally identified by reference numeral 13(j) to facilitate the transfer of data thereamong. The communication links 13(j) may utilize any convenient data transmission medium; in one embodiment, the transmission medium of each communication link 13(j) is selected to comprise one or more fiber optic links. Each communication link 13(j) is preferably bi-directional, allowing the switching nodes 11(n) to transmit and receive signals among each other and with devices 12(m) connected thereto over the same link; in the embodiment in which the communication links 13(j) are fiber optic links, two optical fibers will be provided for each communication link 13(j), each of which facilitates unidirectional transfer of optical signals.

In one embodiment, the network 10 transfers data using the well-known "ATM" ("Asynchronous Transfer Mode") transfer methodology. That methodology is described in detail in C. Partridge, *Gigabit Networking*, (Reading MA: Addison Wesley Publishing Company, 1994), primarily in chapters 3 and 4, and D. McDysan, et al., *ATM Theory And Application* (McGraw Hill, 1995) and will not be described in detail. Generally, with reference to FIG. 2, in the ATM methodology, the devices 12(m) and the switching nodes 11(n) transmit data in the form of fixed-length "cells." In the ATM data transfer methodology, for a packet 20 to be transmitted from a source device $12(m_S)$ to a destination device $12(m_D)$, the source device $12(m_S)$ allocates the data packet 20 to a plurality of "cells," identified CELL(1) through CELL(I) (generally identified "CELL(i)"), for transmission serially over the communication link 13(j) to initiate transfer thereof over the network 10. Each cell includes a header portion HEADER(i) and a data portion DATA(i), with the header portion HEADER(i) including circuit" information which controls the transfer of the cell through the network 10, and the data portion DATA(i) containing data from the packet 20. The data portion DATA(i) of each cell is of fixed, predetermined length (in one embodiment forty-eight bytes) and so the source device $12(m_S)$ will pad the data in the last data portion DATA(i) if the amount of data in the packet 20 is not an integral multiple of the size of the data portion DATA(i) of each cell to ensure that the last data portion DATA(i) has the required length.

As noted above, the source device $12(m_S)$ transmits the series of cells CELL(1) through CELL(i) generated from a data packet 20 in order, and the network 10 is to deliver the cells to the destination device $12(m_D)$ in the order in which they are transmitted. The destination device $12(m_D)$ must receive all of the cells transmitted by the source device $12(m_S)$ in order to reconstruct the packet 20. In the aforementioned ATM transfer methodology, the cells do not contain ordering information; and so the destination device $12(m_D)$ determines the proper order to reconstitute the packet 20 from the order in which it receives the cells. The last cell CELL(i) includes a set end of packet flag, designated EOP in FIG. 2, to indicate that it is the last cell for the packet.

Figure 2:
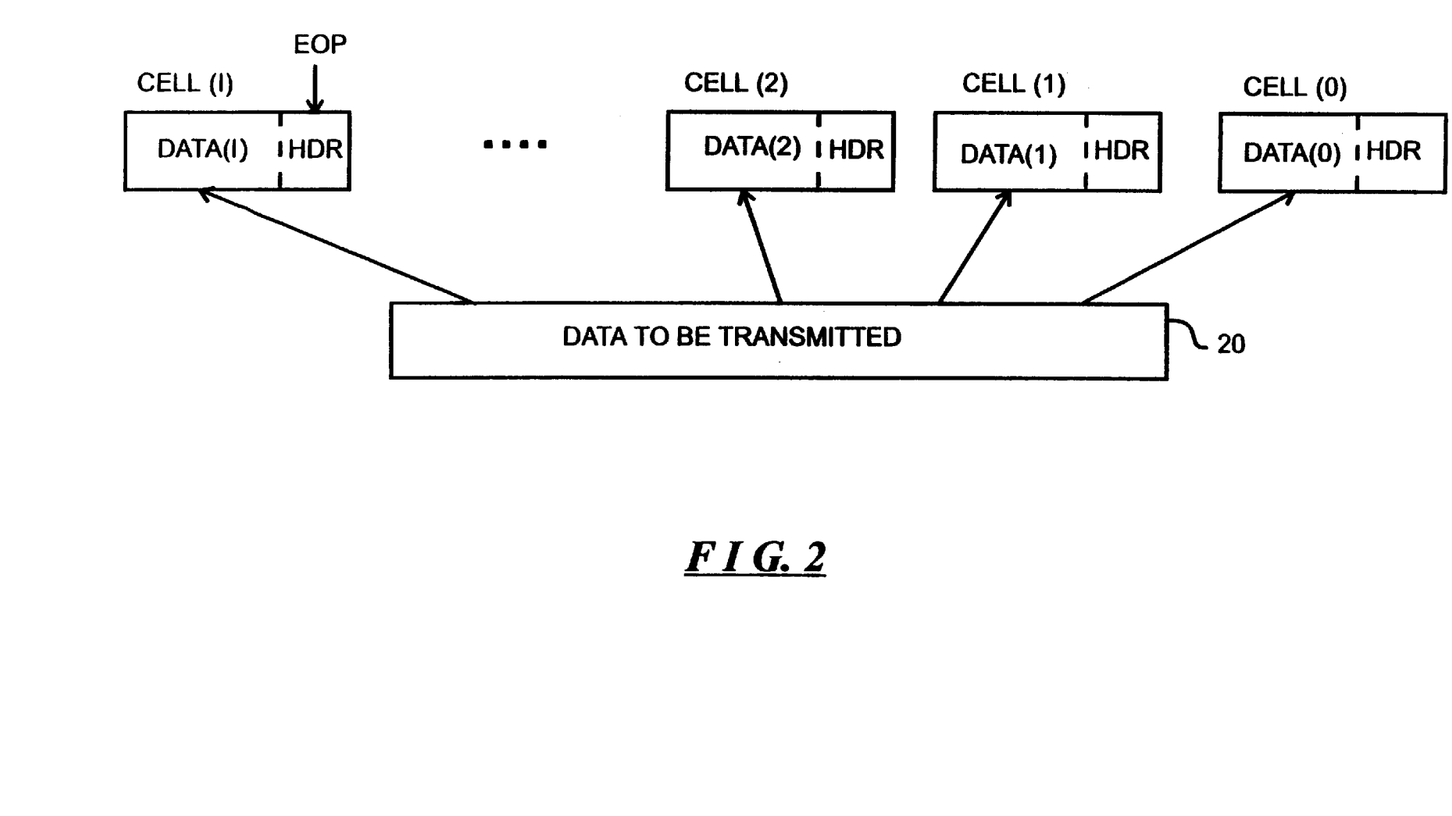
FIG. 2 schematically illustrates the structure of message packets and constituent message cells transferred over the network depicted in FIG. 1.

As further noted above, header portion HEADER(i) includes "virtual circuit" information which controls the transfer of the cell over the network 10. Each switching node 11(n) uses the virtual circuit information for a cell CELL(j) that it receives over an input communication link to identify an output communication link over which it is to transmit the cell to the next switching node or the destination device $12(m_D)$. The virtual circuit information in the headers HEADER(i) of the cells CELL(i) associated with a packet 20 will be the same, but it will differ for cells associated with different packets. Although a destination device $12(m_D)$ will be receiving cells generated for a specific packet 20 in the order of the data in the packet, it maybe contemporaneously receiving cells from the network 10 which originated at several source devices $12(m_S)$, which cells may be received in an interleaved manner. The virtual circuit information in each cell CELL(i) will enable the destination device $12(m_D)$ to determine the packet 20 with which the cell is associated.

For virtual circuits over which cells are transferred using the ATM's ABR (available bit rate) service, in addition to cells, such as those described above in connection with FIG. 2, for transferring data, the network 10 also transfers resource management ("RM") cells which carry flow control information used by the respective source devices 12(mS) to regulate the rate at which they transmit cells over each virtual circuit. Generally, for each virtual circuit for which a device 12(m) is the source device 12(mS), the device 12(mS) periodically transmits an RM cell thereover to the virtual circuit's destination device 12(mD). When the destination device 12(mD) receives the RM cell, it transmits it (that is, the RM cell) back to the source device 12(mS) over the virtual circuit in a reverse direction. The RM cell, when traversing the path from the source device 12(mS) to the destination device 12(mD), is referred to as a "forward" RM ("FRM") cell, and, when traversing the path from the destination device 12(mD) to the source device 12(mS), is referred to as a "backward" RM ("BRM") cell. The destination device 12(mD) and each switching node 11(n) along the path of the virtual circuit from the destination device 12(mD) to the source device 12(mS) can provide flow control information in the BRM cell. The flow control information provided by the destination device 12(mD) or a switching node 11(n) may, for example, be reflective of the degree of congestion at the respective destination device 12(mD) or switching node 11(n), or the like. The flow control information serves to limit the rate at which the source device 12(mS) will transmit cells, above a minimum cell rate ("MCR") which has been assigned to the virtual circuit, and which the source device 12(mS) includes in the FRM cell when it (that is, the source device 12(mS)) transmits the FRM cell.

Typically, when a switching node 11(n) receives an BRM cell for a virtual circuit, it can generate flow control information and determine whether the flow control information indicates a lower cell transmission rate than indicated in the received BRM cell. If not, the switching node 11(n) will transmit the BRM cell with the same flow control information as received. On the other hand, if the switching node 11(n) determines that the flow control information which it generates does indicate a lower cell transmission rate than indicated in the received BRM cell, it will substitute the flow control information which it generated for the received flow control information in the BRM cell before transmitting the BRM cell. Thus, when the source device 12(mS) receives the BRM cell, the flow control information will reflect the minimum of the flow control information as among the destination device 12(mD) and the switching nodes 11(n) which received the BRM cell, which, in turn, is the minimum for the virtual circuit. The invention provides an explicit rate marking system for generating an explicit rate marking system used by the switching nodes 11(n) to generate the flow control information for inclusion in the BRM cells.

Figure 3:
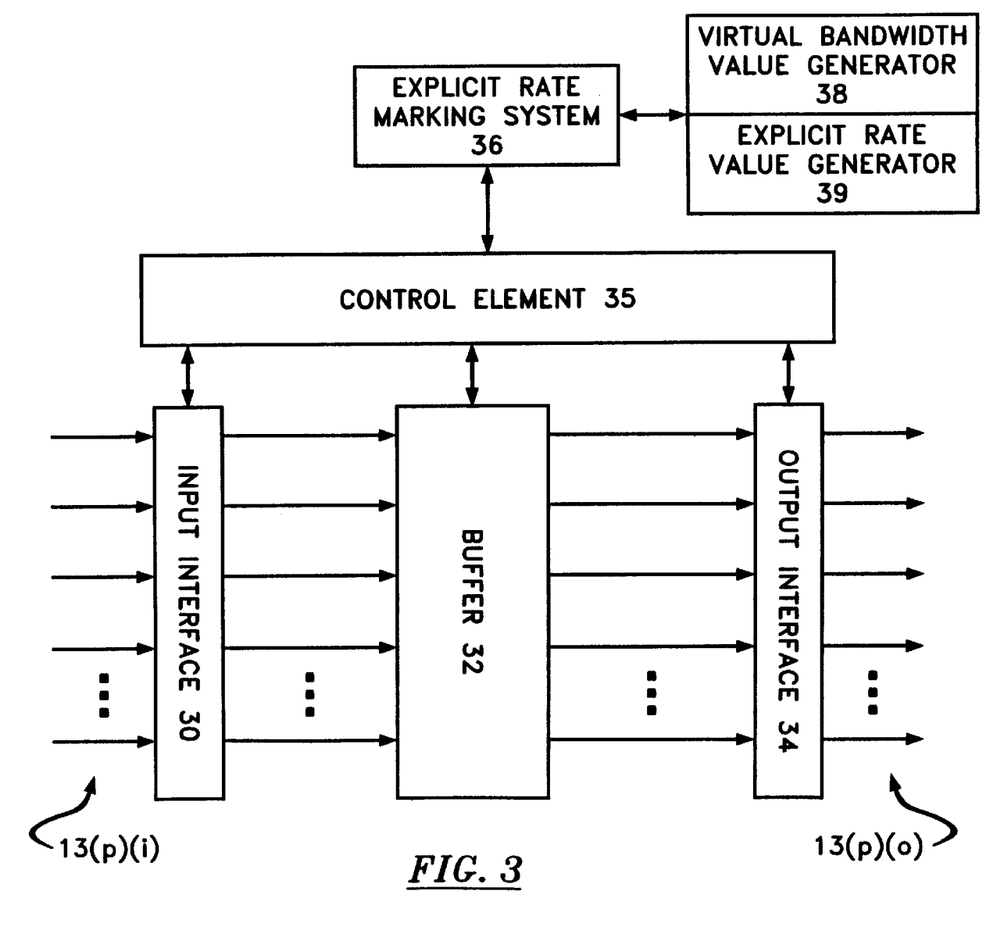
FIG. 3 schematically depicts a switching node, constructed in accordance with the invention, which is used in the computer network depicted in FIG. 1.

The switching nodes 11(n) comprising network 10 all have generally the same structure, which will be described in connection with FIG. 3. With reference to FIG. 3, each switching node 11(n) includes an input interface 30, a buffer 32, and an output interface 34, all under control of a control element 35. To facilitate bi-directional communications, the input interface 30 and output interface 34 will be connected to all of the communication links 13(p) to which the switching node 11(n) is connected to facilitate reception of signals from, and transmission of signals to, others of the switching nodes in the network 10 or ones of the devices 12(m) to which the switching node 11(n) is connected. In the case of the above-described embodiment in which the communication links 13(p) are in the form of optical fibers, the input interface 30 is connected to particular ones of the communication links, namely, input communication links 13(p)(i), over which the switching node 11(n) receives the optical signals, and the output interface 34 is connected to others of the communication links, namely, output communication links 13(p)(o), over which the switching node transmits the optical signals. It will be appreciated that each input communication link 13(p)(i) will constitute an output communication link over which a device 12(m) or another switching node in the network 11 transmits signals, and each output communication link 13(p)(o) will constitute an input communication link over which a device 12(m) or another switching node in the network 11 receives signals.

As noted above, the invention provides an explicit rate marking system 36, which is included in and forms part of control element 35 of the respective switching node 11(n), for generating flow control information for inclusion in the BRM cells received thereby. The rate marking system includes a virtual bandwidth value generator module 38 and an explicit rate value generator module 39. The explicit rate marking system 36 will be described in connection with the illustrative network 10, in which five illustrative virtual circuits are established between respective source and destination devices as follows:

(i) virtual circuit (1) between source device 12(1) and destination device 12(6) through switching nodes 11(1) through 11(4) and over communication links 13(1) through 13(4), 13(5) and 13(1), with an MCR of 10 (in arbitrary units), (ii) virtual circuit (2) between source device 12(2) and destination device 12(7) through switching nodes 11(1) and 11(2) and over communication links 13(1), 13(6) and 13(11), with an MCR of 2, (iii) virtual circuit (3) between source device 12(3) and destination device 12(3) through switching nodes 11(1), 11(2) and 11(3) and over communication links 13(1), 13(2), 13(7) and 13(12), with an MCR of 3, (iv) virtual circuit (4) between source device 12(4) and destination device 12(9) through switching nodes 11(2), 11(3) and 11(4) and over communication links 13(2), 13(3), 13(8) and 13(13), with an MCR of 10, and (v) virtual circuit (5) between source device 12(5) and destination device 12(10) through switching nodes 11(4) and 11(5) and over communication links 13(4), 13(9) and 13(14), with an MCR of 50.

In addition, each communication link 13(1) through 13(4) interconnecting the respective switching nodes 11(n) has a maximum bandwidth capacity $C_j$ available for the ABR service; in the illustrative network 10, communication link 13(1) has a capacity $C_1=150$ (in arbitrary units), communication links 13(2) and 13(3) have respective capacities $C_2=C_3=100$, and communication link 13(4) has a capacity $C_4=60$. It will be appreciated that the explicit rate $R_i$ for the "i-th" virtual circuit (i=1, . . . , 5) will be the minimum of the link explicit rates $R_{ij}$ over the communication links 13(j) which form the path for the virtual circuit, that is, $$R_i = \min\{R_{i,j} | j \in J(i)\} \qquad (1),$$

where "J(i)" corresponds to the set of communication links which form the path for the "i-th" virtual circuit.

As is clear communication links 13(1) through 13(4) interconnecting switching nodes 11(n) can form paths for multiple virtual circuits. Generally, in determining the link explicit rate $R_{ij}$ for each virtual circuit, it is desired to be "fair" to each virtual circuit to maximize the utilization of the respective communication link 13(j). There are two general methodologies for determining fairness, namely, an equal share methodology and a proportional methodology. In the equal share methodology, the portion of the bandwidth for a communication link 13(j) forms part of the path (which will be referred to as the "excess bandwidth"), is divided among the virtual circuits on an equal basis, and the link explicit rate $R_{ij}$ for the "I-th" virtual circuit will be the sum of that and the virtual circuits MCR, that is $$R_{i,j} = MCR_i + \frac{C'_j - \sum_{i \in I(j)} MCR_i}{|I(j)|} \qquad (2)$$

were "|I(j)|" represents the number of virtual circuits for which the communication link 13(j) forms part of a path. On the other hand, in the proportional share methodology, the entire bandwidth is divided among the virtual circuits on a basis in proportion to their MCR's, that is $$R_{i,j} = C'_j \frac{MCR_i}{\sum_{i \in I(j)} MCR_i}. \qquad (3)$$

It will be appreciated that, under the equal share methodology, virtual circuits (1), (2) and (3) will have link explicit rates $R_{ij}$ of 55, 47 and 48, respectively, and under the proportional share methodology, they will have link explicit rates $R_{ij}$ of 100, 20, and 30, respectively, A similar operation can be performed at every communication link 13(j) to determine the link explicit rate $R_{i,j}$ for the respective link and virtual circuit, and, as noted above, the explicit rate $R_i$ for each virtual circuit will be the minimum of the link explicit rates $R_{i,j}$ for the respective virtual circuit. In that connection, since the sum) of the MCR's for the virtual circuit's (1) and (5) for which communication link 13(4) forms part of their respective paths, equals the capacity $C_4=60$, it is apparent that, even though virtual circuit (1) could, over communication link 13(1) be allocated an explicit rate higher than 10, because the virtual circuit is bottlenecked by the communication link 13(4), it (that is, virtual circuit(1)) can only be allocated an explicit rate $R_i$ of 10 at communication link 13(1). Accordingly, since the explicit rate for virtual circuit (1) at communication link 13(1)

$$R_{i,j} = C_j \frac{MCR_i}{\sum_{i \in I(j)} MCR_i}. \quad (3)$$

will be far below that that could be assigned to the virtual circuit for communication link 13(1) as described above, there will be additional bandwidth capacity over communication link 13(1) which can be assigned to virtual circuits (2) and (3), in which case they will be assigned link explicit rates of, for example, 56 and 84, respectively, using the proportional share methodology.

The explicit rate marking system 36 provided by the invention determines the explicit rate using a virtual bandwidth methodology, in which for a communication link 13(j), if a virtual circuit for which the communication link 13(j) forms part of the path is bottlenecked over another virtual circuit, the explicit rate marking system 36 determines the link explicit rate(s) of other virtual circuits which use it (that is, communication link 13(j)) as part of the path, by generating a virtual bandwidth value $C'_j$ available for the ABR service, and determining link explicit rates as described above in connection with equations (2) and (3) using the virtual bandwidth value $C'_j$ as well as the actual bandwidth capacity $C_j$ available for the ABR service. For the virtual circuits which are not bottlenecked, the link explicit rate $R_{i,j}$ will be the link explicit rate so determined, whereas for the virtual circuits which are bottlenecked. The explicit rate marking system 36 determines the virtual bandwidth value $C'_j$ according to $$C'_j = \left( C_j - \sum_{i \in I_U(j)} MCR_i - \sum_{i \in I_B(j)} R_i \right) \frac{N_j}{|I_U(j)|} + \sum_{i \in I(j)} MCR_i, \quad (4)$$

or the equal share methodology, and $$C'_j = \left( C_j - \sum_{i \in I_B(j)} R_i \right) \frac{\sum_{i \in I(j)} MCR_i}{\sum_{i \in I_U(j)} MCR_i}, \quad (5)$$

for the proportional share methodology, where $I_B(j)$ corresponds to the set of virtual circuits which are bottlenecked elsewhere, $I_U(j)$ corresponds to the set of virtual circuits which are not bottlenecked elsewhere, and $N_j$ represents the number of virtual circuits for which the communication link 13(j) forms part of the path (which, in turn, corresponds to $|I(j)|$ in equation (2)).

It will be appreciated that, for the proportional share methodology (reference equation (5)), the virtual bandwidth $C'_j$ for communication link 13(j) corresponds to the bandwidth capacity available for virtual circuits which are not bottlenecked, which corresponds to $$C_j - \sum_{i \in I_B(j)} R_i,$$

multiplied by the ratio of the MCR's for all virtual circuits for which the communication link 13(j) 7 forms part of the path, to the MCR's for the unblocked virtual circuits for which the communication link 13(j) forms part of the path. It will be appreciated that, if the virtual bandwidth $C'_j$ is used instead of bandwidth capacity $C_j$ in equation (3), $$R_{i,j} = \left( C_j - \sum_{i \in I_B(j)} R_i \right) \frac{MCR_i}{\sum_{i \in I_U(j)} MCR_i},$$

that is, the link explicit rate for an unbottlenecked virtual circuit corresponds to the bandwidth capacity available for virtual circuits which are not bottlenecked multiplied by the ratio of the MCR of the respective virtual circuit to the sum of the MCR's of the virtual circuits which are not bottlenecked.

The virtual bandwidth $C'_j$ for the equal share methodology is somewhat more complex. The factor $$C_j - \sum_{i \in I_U(j)} MCR_i - \sum_{i \in I_B(j)} R_i$$

corresponds to the amount of bandwidth capacity for communication link 13(j) which is available for distribution to unbottlenecked virtual circuits, that is, the total bandwidth capacity $C(j)$, minus the bandwidth capacity taken up by the bottlenecked virtual circuits $$\sum_{i \in I_B(j)} R_i,$$

and minus the bandwidth capacity required to provide the MCR's for the unbottlenecked virtual circuits $$\sum_{i \in I_U(j)} MCR_i.$$

The factor $$\frac{N_j}{|I_U(j)|},$$

when the virtual bandwidth $C'_j$ (equation (4)) is used to determine the link explicit rate for a virtual circuit (equation (2)) will provide a factor of $$\frac{1}{|I_U(j)|},$$

effectively dividing the bandwidth capacity available for distribution to unbottlenecked virtual circuits by the number of unbottlenecked virtual circuits. When the equal share methodology virtual bandwidth (equation (4)) is used in determining the link explicit rate $R_{i,j}$, the addend $$\sum_{i \in I(j)} MCR_i$$

in equation (4) will cancel the same value in the quotient, so that the link explicit rate $R_{i,j}$ in the equal share methodology will correspond to $$R_{i,j} = MCR_i + \frac{1}{|I_U(j)|}\left( C_j - \sum_{i \in I_U(j)} MCR_i - \sum_{i \in I_B(j)} R_i \right).$$

Figure 4:
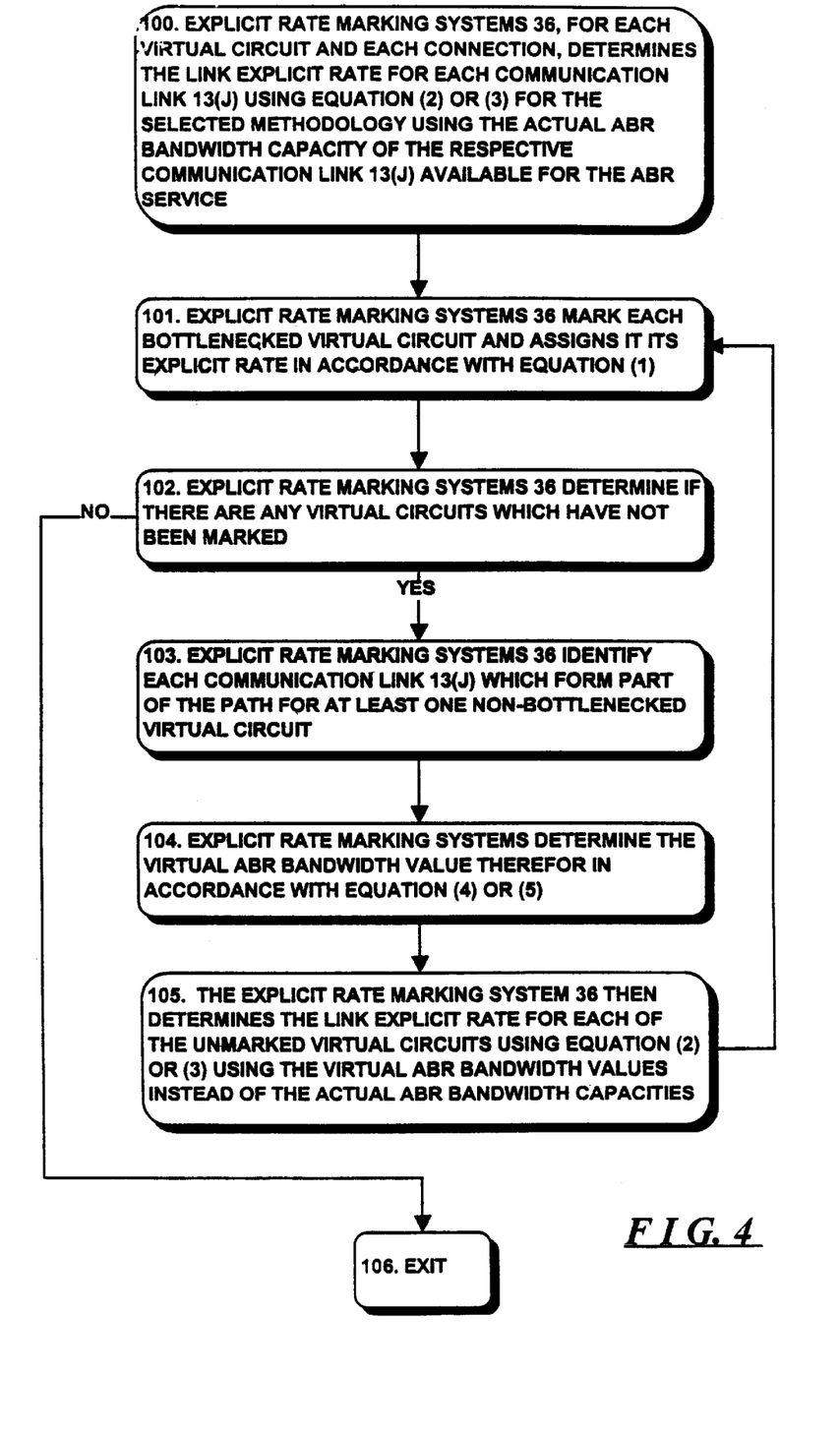
FIG. 4 is a flow chart depicting general operations performed by an explicit rate marking system constructed in accordance with the invention.

The general operations performed by the explicit rate marking systems 36 of the switching nodes 11(n) to determine the explicit rate $R_i$ for each virtual circuit will be described in connection with the flowchart depicted in FIG. 4. With reference to FIG. 4, each explicit rate marking system 36, for each virtual circuit and each connection, initially determines the link explicit rate $R_{i,j}$ for each communication link 13(j) using equation (2) or (3) for the selected methodology using the actual bandwidth capacity $C_j$ of the respective communication link 13(j) available for the ABR service (step 100). Thereafter, the explicit rate marking system 36 marks each bottlenecked virtual circuit and assigns it its explicit rate $R_i$ in accordance with equation (1) (step 101). The explicit rate marking system 36 then determines if there are any virtual circuits which have not been marked (step 102). If the explicit rate marking system 36 makes a positive determination in step 102, it has not determined the explicit rate $R_i$ for all of the virtual circuits, and in that case it will sequence to step 103 in which it identifies each communication link 13(j) which forms part of the path for at least one non-bottlenecked virtual circuit, and thereafter determine the virtual bandwidth value therefor in accordance with equation (4) or (5) (step 104). The explicit rate marking system 36 then determines the link explicit rate $R_{i,j}$ for each of the unmarked virtual circuits using equation (2) or (3) using the virtual bandwidth values $C'_j$ instead of the actual bandwidth capacities $C_j$ (step 105) and returns to step 101 to identify and mark virtual circuits which are determined to be bottlenecked using the new link explicit rates. The explicit rate marking system 36 repeats steps 101 through 105 until it determines in step 102 that all of the virtual circuits have been marked, at which point it will exit (step 106). It will be appreciated that, by the point at which the explicit rate marking system 36 determines that all virtual circuits have been marked, explicit rates $R_i$ will have been determined for all of the virtual circuits.

Figure 5:
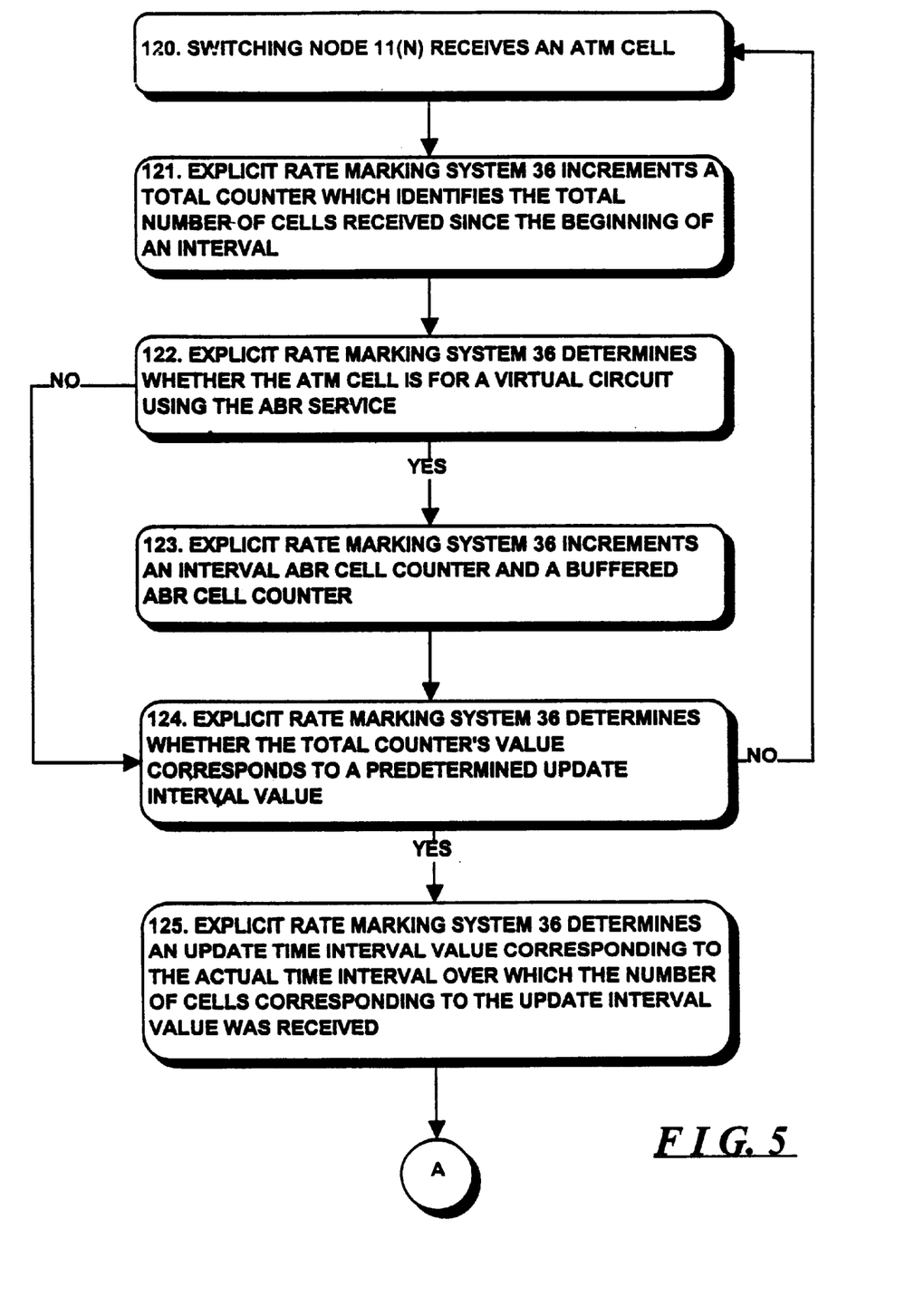
FIGS. 5 and 6 are flow charts depicting details of operations performed by the explicit rate marking system.
Figure 5A:
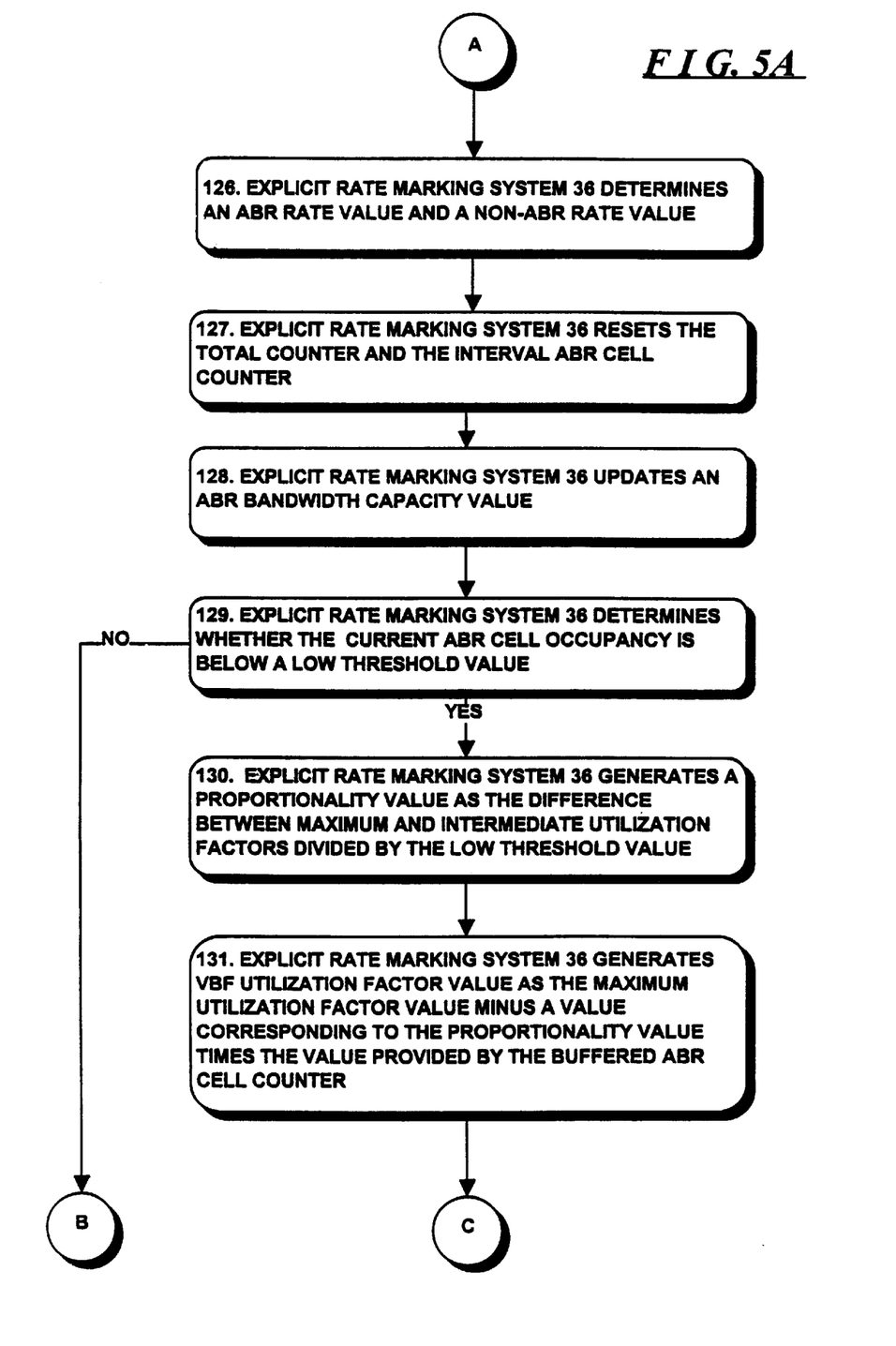
Figure 5B:
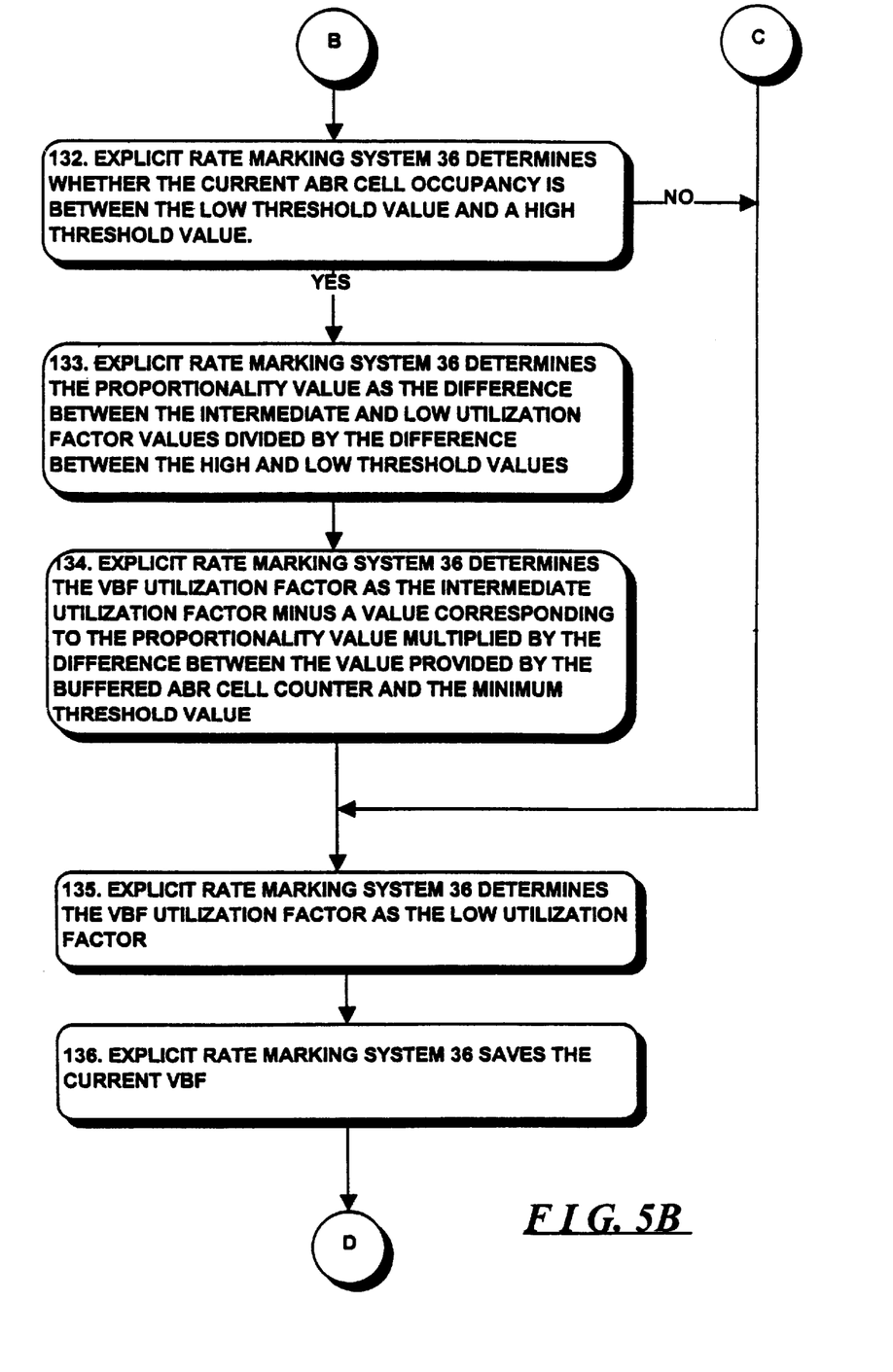
Figure 5C:
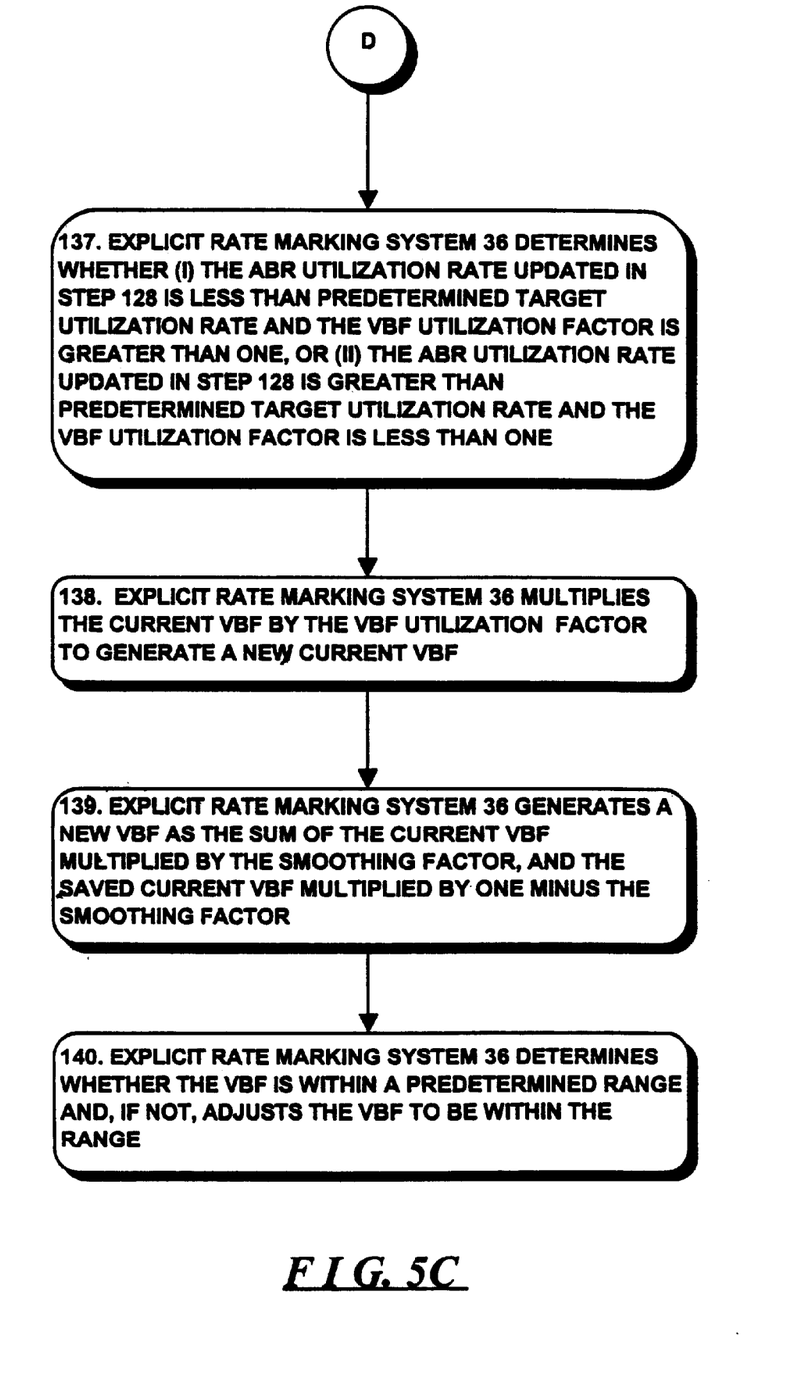

In one embodiment, instead of updating the virtual bandwidth value $C'_j$ available to the ABR service explicitly as described above in connection with equations (4) or (5), the explicit rate marking system 36 maintained by each switching node 11(n), after generating the virtual bandwidth value once, can make use of a virtual bandwidth factor "vbf," which it periodically updates as ATM cells are received and transmitted. The virtual bandwidth factor relates the bandwidth capacity $C_j$ available for the ABR service to the virtual bandwidth $C'_j$ according to $C'_j = vbf * C_j$ (where "*" is the multiplication operation). In that embodiment, operations performed by the explicit rate marking system 36 when an ATM cell arrives at a switching node 11(n) over communication link 13(j) will be described in connection with the flow chart depicted in FIG. 5. With reference to FIG. 5, when the switching node 11(n) receives an ATM cell (step 120), initially the explicit rate marking system 36 updates several counters which are used for monitoring cell traffic load and capacity. In particular, the explicit rate marking system 36 will increment a total counter which identifies the total number of cells received since the beginning of an interval (step 121). The explicit rate marking system 36 will also determine whether the ATM cell is for a virtual circuit using the ABR service (step 122), and, if so, increment an interval ABR cell counter and a buffered ABR cell counter (step 123). The interval ABR cell counter identifies the number of ATM cells which have been received since the beginning of the same interval. The buffered ABR cell counter identifies the number of cells for virtual circuits which utilize the ABR service currently in the switching node's buffer 32. Thereafter, the explicit rate marking system 36 determines whether the total counter's value corresponds to a predetermined update interval value (step 124). If the explicit rate marking system 36 makes a negative determination in step 124, it will return to step 120 to wait for the arrival of the next ATM cell.

On the other hand, if the explicit rate marking system 36 makes a positive determination in step 124, it will sequence to a series of steps to update the variable bandwidth factor vbf. Initially, the explicit rate marking system 36 determines an update time interval value corresponding to the actual time interval over which the number of cells corresponding to the update interval value was received (step 125). Using the update time interval value, the explicit rate marking system 36 will determine an ABR rate value and a non-ABR rate value (step 126), the ABR rate value corresponding to the value provided by the interval ABR cell counter divided by the update time interval value and the non-ABR rate value corresponding to the difference between the value provided by the total counter and the interval ABR cell counter divided by the update time interval value. Thereafter, the explicit rate marking system 36 can reset the total counter and the interval ABR cell counter (step 127) for use during the next cell reception interval.

After the counters have been reset in step 127, the explicit rate marking system 36 updates an ABR bandwidth capacity value (which corresponds to $C_j$ above) and an ABR utilization value (step 128). The ABR bandwidth capacity value reflects the bandwidth that is currently available for the ABR service. The explicit rate marking system 36 updates the ABR bandwidth capacity value in relation to a smoothing value, the previously generated ABR bandwidth capacity value and the difference between the a target bandwidth utilization capacity for the respective communication link 13(j) and the non-ABR rate value as determined in step 126. It will be appreciated that the difference will generally correspond to the bandwidth capacity that is then available for the ABR service over the respective communication link. Generally, the smoothing value is selected to be between zero and one, and the explicit rate marking system 36 generates the updated ABR bandwidth capacity value as the smoothing value multiplied by the difference between the target bandwidth utilization capacity for the respective communication link 13(j) and the non-ABR rate value, plus one minus the smoothing value multiplied by the current ABR bandwidth capacity value. The smoothing value is used to smooth changes which may occur between vbf updates, and in one embodiment is selected to be on the order of one-eighth.

The ABR utilization value updated in step 128 reflects the portion of ABR bandwidth capacity that is currently being utilized. The explicit rate marking system 36 updates the ABR utilization value in relation to the smoothing value, the ABR rate value generated in step 126, the just-generated ABR bandwidth capacity value and the current ABR utilization value. Generally, the ABR rate divided by the ABR bandwidth capacity value reflects the portion of the ABR bandwidth capacity that is currently being utilized. Accordingly, the explicit rate marking system 36 generates the updated ABR utilization value as the smoothing value multiplied by the ABR rate and divided by the ABR capacity value, plus one minus the smoothing value multiplied by the current ABR utilization value.

Following step 128, the explicit rate marking system 36 generates the value of a vbf utilization factor, in relation to the current ABR cell occupancy of the buffer 32 as determined by the buffered ABR cell counter and three predetermined utilization factor values, namely, an maximum utilization factor value, an intermediate utilization factor value and a minimum utilization factor value. In that operation, the explicit rate marking system 36 initially determines whether the current ABR cell occupancy is below a low threshold value (step 129). If the explicit rate marking system 36 makes a positive determination in step 129, the number of cells for virtual circuits utilizing the ABR service is relatively low. In that case, the explicit rate marking system 36 initially generates a proportionality value as the difference between the maximum and intermediate utilization factors divided by the low threshold value (step 13(j), and the vbf utilization factor value as the maximum utilization factor value minus a value corresponding to the proportionality value times the value provided by the buffered ABR cell counter (step 131).

If the explicit rate marking system 36 makes a negative determination in step 129, it sequences to step 132, in which it determines whether the current ABR cell occupancy is between the low threshold value and a high threshold value. If the explicit rate marking system 36 makes a positive determination in step 132, it will determine the proportionality value as the difference between the intermediate and low utilization factor values divided by the difference between the high and low threshold values (step 133) and the vbf utilization factor as the intermediate utilization factor minus a value corresponding to the proportionality value determined in step 133 multiplied by the difference between the value provided by the buffered ABR cell counter and the minimum threshold value (step 134).

Finally, if the explicit rate marking system 36 makes a negative determination in step 132, it will be appreciated that the current ABR cell occupancy is above the high threshold value. In that case, the explicit rate marking system 36 determines the vbf utilization factor as the low utilization factor (step 135).

Preferably, the high and low threshold values, and the values for the maximum, intermediate and minimum utilization factor will be selected so that, (i) if the buffered ABR cell occupancy is zero, the vbf utilization factor value will correspond to the maximum utilization factor;

(ii) as the buffered ABR cell occupancy increases and approaches the low threshold value, the vbf utilization factor value will decrease from the high utilization factor and approach the intermediate utilization factor;

(iii) as the buffered ABR cell occupancy further increases an approaches the high threshold value, the vbf utilization factor value will continue decreasing from the intermediate utilization factor and approach the minimum utilization factor, and (iv) if the buffered ABR cell occupancy is above the high threshold value, the vbf utilization factor value will correspond to the minimum utilization factor.

In one embodiment, the maximum utilization factor is selected to have a value of on the order of 1.2, the intermediate utilization factor is selected to have a value of on the order of 0.9 and the minimum utilization factor is selected to have a value of on the order of 0.8.

After the explicit rate marking system 36 has determined the vbf utilization factor in step 131, 134 or 135, it proceeds to a series of steps in which it actually generates the value for the virtual bandwidth factor (vbf). Initially, the explicit rate marking system 36 will save the current vbf (step 136). Thereafter, the explicit rate marking system 36 determines whether (i) the ABR utilization rate updated in step 128 is less than predetermined target utilization rate and the vbf utilization factor is greater than one, or (ii) the ABR utilization rate updated in step 128 is greater than predetermined target utilization rate and the vbf utilization factor is less than one (step 137), and, if so multiplies the current vbf by the vbf utilization factor to generate a new current vbf (step 138). Following step 138, the explicit rate marking system 36 generates a new vbf as the sum of the current vbf multiplied by the smoothing factor, and the saved current vbf multiplied by one minus the smoothing factor (step 139). Thereafter, the explicit rate marking system 36 can determine whether the vbf is within a predetermined range and, if not, adjust the vbf to be within the range (step 140).

Figure 6:
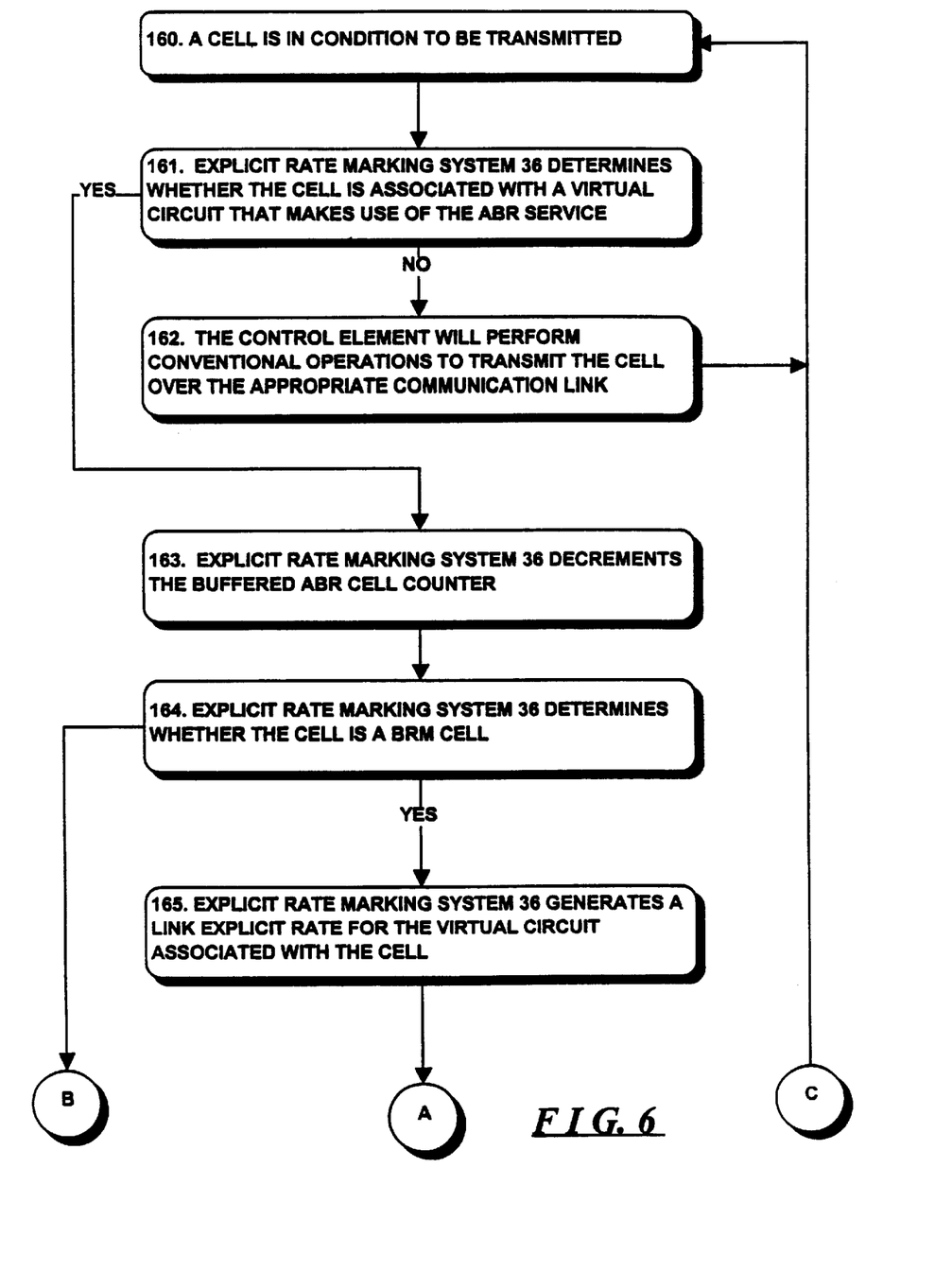
Figure 6A:
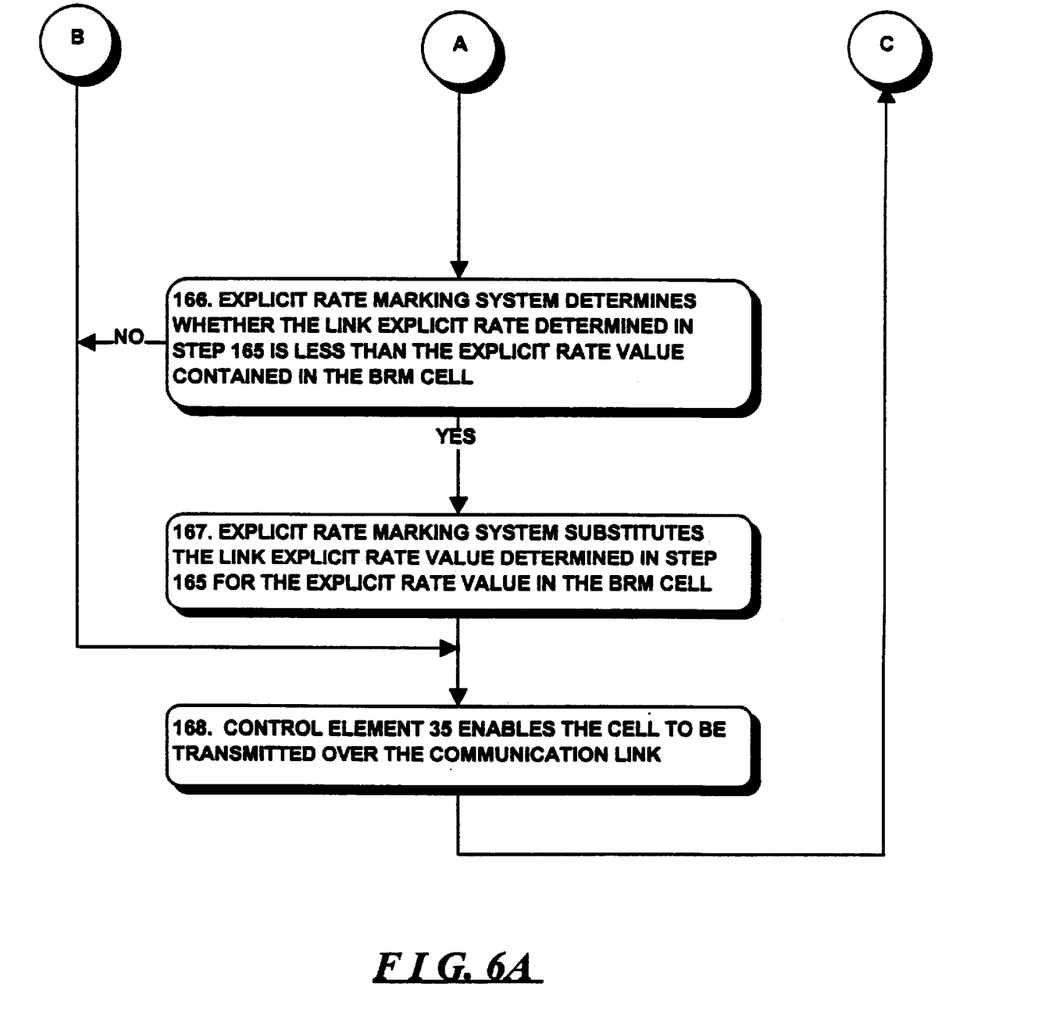

Operations performed by the explicit rate marking system 36 when an ATM cell is transmitted will be described in connection with FIG. 6. With reference to FIG. 6, when a cell is in condition to be transmitted (step 160), the explicit rate marking system 36 determines whether the cell is associated with a virtual circuit that makes use of the ABR service (step 161). If the explicit rate marking system 36 makes a negative determination in step 161, the control element will perform conventional operations to transmit the cell over the appropriate communication link 13(j) (step 162). On the other hand, if the explicit rate marking system 36 makes a positive determination in step 161, it will initially decrement the buffered ABR cell counter (step 163). Thereafter, the explicit rate marking system 36 will determine whether the cell is a BRM (backward RM) cell (step 164). If the explicit rate marking system 36 makes a positive determination in step 164, it proceeds to generate a link explicit rate $R_{i,j}$ for the virtual circuit associated with the cell (step 165). If the explicit rate marking system 36 makes use of the equal shares methodology, it will make use of equation (2), and if it makes use of the proportional share methodology it will make use of equation (3). In both cases, the explicit rate marking system 36 uses the virtual bandwidth value $C'_j$ instead of the bandwidth value $C_j$ available for the ABR service, and determines the virtual bandwidth value $C'_j$ as the ABR capacity multiplied by the most recently determined vbf value. The explicit rate marking system 36 then determines whether the link explicit rate $R_{i,j}$ determined in step 165 is less than the explicit rate value contained in the BRM cell (step 166) and, if so, substitutes the link explicit rate value determined in step 165 for the explicit rate value in the BRM cell (step 167). Following step 167, step 166 if a negative determination is made in that step, or step 164 if a negative determination is made in that step, the control element 35 will enable the cell to be transmitted over the communication link 13(j) (step 168).

The invention provides a number of advantages. In particular, the invention provides an explicit rate marking system 36 which can, for each switching node 11(n), generate explicit rates for virtual circuits which use the respective switching node, generally only in relation to their respective MCR's, the number of bottlenecked and unbottlenecked virtual circuits, and the amount of bandwidth capacity available for the ABR service, which simplifies assignment of ABR bandwidth capacity to each virtual circuit even if one or more of the virtual circuits is bottlenecked.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be Secured by Letters Patent of the United States is:

1. An explicit rate marking system for use in connection with a switching node to generate an explicit rate value for use in a resource management cell associated with a virtual circuit in an ATM network, the explicit rate marking system comprising:

A. a virtual bandwidth value generator module configured to generate a virtual bandwidth value reflecting an available bandwidth capacity value, an explicit rate value associated with each bottlenecked virtual circuit for which said switching node forms part of a path, and a minimum cell rate value associated with each unbottlenecked virtual circuit for which said switching node forms part of a path, and B. an explicit rate value generator module configured to generate the explicit rate value in relation to the virtual bandwidth value and the minimum cell rate value associated with the virtual circuit and other virtual circuits for which said switching node forms part of a path, the explicit rate marking system generating said explicit rate value in accordance with an equal share methodology, and in which said virtual bandwidth value generator module is configured to generate said virtual bandwidth value $C'_j$ in accordance with $$C'_j = \left(C_j - \sum_{i \in I_U(j)} MCR_i - \sum_{i \in I_B(j)} R_i\right)\frac{N_j}{|I_U(j)|} + \sum_{i \in I(j)} MCR_i,$$

where $C_j$ represents the available bandwidth capacity value, $MCR_i$ represents the minimum cell rate for the "i-th" virtual circuit, $I_B(j)$ corresponds to the set of virtual circuits which are bottlenecked, $I_U(j)$ corresponds to the set of virtual circuits which are bottlenecked, $N_j$ is related to the number of virtual circuits for which the switching node part of the path.

2. An explicit rate marking system as defined in claim 1 in which said explicit rate value generator module is configured to generate said explicit rate value $R_{i,j}$ in accordance with $$R_{i,j} = MCR_i + \frac{C'_j - \sum_{i \in I(j)} MCR_i}{|I(j)|}.$$

3. An explicit rate marking system for use in connection with a switching node to generate an explicit rate value for use in a resource management cell associated with a virtual circuit in an ATM network, the explicit rate marking system comprising:

A. a virtual bandwidth value generator module configured to generate a virtual bandwidth value reflecting an available bandwidth capacity value, an explicit rate value associated with each bottlenecked virtual circuit for which said switching node forms part of a path, and a minimum cell rate value associated with each unbottlenecked virtual circuit for which said switching node forms part of a path, and B. an explicit rate value generator module configured to generate the explicit rate value in relation to the virtual bandwidth value and the minimum cell rate value associated with the virtual circuit and other virtual circuits for which said switching node forms part of a path, the explicit rate marking system generating said explicit rate value in accordance with a proportional share methodology, and in which said virtual bandwidth value generator module is configured to generate said virtual bandwidth value $C'_j$ in accordance with $$C'_j = \left(C_j - \sum_{i \in I_B(j)} R_i\right)\frac{\sum_{i \in I(j)} MCR_i}{\sum_{i \in I_U(j)} MCR_i},$$

where $C_j$ represents the available bandwidth capacity value, $MCR_i$ represents the minimum cell rate for the "I-th" virtual circuit, $I_B(j)$ corresponds to the set of virtual circuits which are bottlenecked, $I_U(j)$ corresponds to the set of virtual circuits which are not bottlenecked.

4. An explicit rate marking system as defined in claim 3 in which said explicit rate value generator module is configured to generate said explicit rate value $R_{i,j}$ in accordance with $$R_{i,j} = C'^0_j \frac{MCR_i}{\sum_{i \in I(j)} MCR_i}.$$

5. An explicit rate marking method for use in connection with a switching node to generate an explicit rate value for use in a resource management cell associated with a virtual circuit in an ATM network, the explicit rate marking method comprising:

A a virtual bandwidth value generator step including the step of generating a virtual bandwidth value reflecting an available bandwidth capacity value, an explicit rate value associated with each bottlenecked virtual circuit for which said switching node forms part of a path, and a minimum cell rate value associated with each unbottlenecked virtual circuit for which said switching node forms part of path, and B. an explicit rate value generating step including the step of generating the explicit rate value in relation to the virtual bandwidth value and the minimum cell rate value associated with the virtual circuit and other virtual circuits for which said switching node forms part of a path, the explicit rate marking method facilitating the generation of said explicit rate value in accordance with an equal share methodology, and said virtual bandwidth value generating step including the step of generating generate said virtual bandwidth value $C'_j$ in accordance with $$C'_j = \left(C_j - \sum_{i \in I_U(j)} MCR_i - \sum_{i \in I_B(j)} R_i\right) \frac{N_j}{|I_U(j)|} + \sum_{i \in I(j)} MCR_i,$$

where $C_j$ represents the available bandwidth capacity value, $MCR_i$ represents the minimum cell rate for the "I-th" virtual circuit, $I_B(j)$ corresponds to the set of virtual circuits which are bottlenecked, $I_U(j)$ corresponds to the set of virtual circuits which are not bottlenecked, and $N_j$ is related to the number of virtual circuits for which the switching node part of the path.

6. An explicit rate marking method as defined in claim 5, said explicit rate value generating step including the step of generating said explicit rate value $R_{i,j}$ in accordance with $$R_{i,j} = MCR_i + \frac{C'_j - \sum_{i \in I(j)} MCR_i}{|I(j)|}.$$

7. An explicit rate marking method for use in connection with a switching node to generate an explicit rate value for use in a resource management cell associated with a virtual circuit in an ATM network, the explicit rate marking method comprising:

A. a virtual bandwidth value generator step including the step of generating a virtual bandwidth value reflecting an available bandwidth capacity value, an explicit rate value associated with each bottlenecked virtual circuit for which said switching node forms part of a path, and a minimum cell rate value associated with each unbottlenecked virtual circuit for which said switching node forms part of path, and B. an explicit rate value generating step including the step of generating the explicit rate value in relation to the virtual bandwidth value and the minimum cell rate value associated with the virtual circuit and other virtual circuits for which said switching node forms part of a path, the explicit rate marking method facilitating generation of said explicit rate value in accordance with a proportional share methodology, and in which said virtual bandwidth value generating step of generating said virtual bandwidth value $C'_j$ in accordance with $$C'_j = \left(C_j - \sum_{i \in I_B(j)} R_i\right) \frac{\sum_{i \in I(j)} MCR_i}{\sum_{i \in I_U(j)} MCR_i},$$

where $C_j$ represents the available bandwidth capacity value, $MCR_i$ represents the minimum cell rate for the "I-th" virtual circuit, $I_B(j)$ corresponds to the set of virtual circuits which are bottlenecked, $I_U(j)$ corresponds to the set of virtual circuits which are not bottlenecked.

8. An explicit rate marking method as defined in claim 7 which said explicit rate value generating step includes the step of generating said explicit rate value $R_{i,j}$ in accordance with $$R_{i,j} = C'^0_j \frac{MCR_i}{\sum_{i \in I(j)} MCR_i}.$$

* * * * *